(12) United States Patent
Pelletier et al.

(10) Patent No.: US 8,948,206 B2
(45) Date of Patent: Feb. 3, 2015

(54) INCLUSION OF QUALITY OF SERVICE INDICATION IN HEADER COMPRESSION CHANNEL

(75) Inventors: Ghyslain Pelletier, Boden (SE); Kristofer Sandlund, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 530 days.

(21) Appl. No.: 11/846,880

(22) Filed: Aug. 29, 2007

(65) Prior Publication Data
US 2008/0056273 A1    Mar. 6, 2008

Related U.S. Application Data

(60) Provisional application No. 60/824,242, filed on Aug. 31, 2006.

(51) Int. Cl.
*H04J 3/18* (2006.01)
*H04L 29/06* (2006.01)
*H04L 29/08* (2006.01)

(52) U.S. Cl.
CPC ............ *H04L 69/04* (2013.01); *H04L 67/04* (2013.01); *H04L 69/22* (2013.01)
USPC ............................................. 370/477

(58) Field of Classification Search
CPC .......... H04L 69/04; H04L 69/22; H04L 67/04
USPC ............................................. 370/477
See application file for complete search history.

(56) References Cited

U.S. PATENT DOCUMENTS

| | | | |
|---|---|---|---|
| 6,618,397 B1 * | 9/2003 | Huang | 370/474 |
| 6,882,637 B1 * | 4/2005 | Le et al. | 370/349 |
| 2002/0003787 A1 * | 1/2002 | Hayama et al. | 370/335 |
| 2002/0038385 A1 * | 3/2002 | Kalliokulju | 709/247 |
| 2002/0126675 A1 * | 9/2002 | Yoshimura et al. | 370/395.21 |
| 2003/0198226 A1 * | 10/2003 | Westberg | 370/393 |
| 2004/0066764 A1 * | 4/2004 | Koodli et al. | 370/331 |

(Continued)

FOREIGN PATENT DOCUMENTS

EP    1 271 886 A2    1/2003

OTHER PUBLICATIONS

Degermark, M. RFC 2507—IP Header Compression. Feb. 1999.*

(Continued)

*Primary Examiner* — Jason Mattis
*Assistant Examiner* — Stephen J Clawson
(74) *Attorney, Agent, or Firm* — Nixon & Vanderhye, P.C.

(57) ABSTRACT

Quality of service information ($QoS_I$) is included with a compressed header of a data packet and can be utilized by nodes supporting the header compression channel to perform QoS enforcements at a sub-flow granularity level. A basic mode of a method comprises (1) processing a packet using a process having a process-associated quality of service requirement to form a processed packet, and (2) including, with a compressed header for the processed packet, the header-included quality of service information which is derived using information indicative of the process-associated quality of service requirement. In another mode the header-included quality of service information is derived both from the process-associated quality of service requirement and quality of service information extracted from the received packet.

28 Claims, 13 Drawing Sheets

(56) References Cited

U.S. PATENT DOCUMENTS

| | | | |
|---|---|---|---|
| 2006/0153227 A1* | 7/2006 | Hwang et al. | 370/465 |
| 2007/0206545 A1* | 9/2007 | Lee et al. | 370/338 |
| 2008/0285501 A1* | 11/2008 | Zhang et al. | 370/315 |
| 2010/0020820 A1* | 1/2010 | Jones | 370/465 |

OTHER PUBLICATIONS

Bormann, C. et. al. Network Working Group. RFC 3095—Robust Header Compression Standard. Jul. 2001.*

International Search Report and Written Opinion mailed Feb. 8, 2008 in corresponding PCT application PCT/SE2007/050597.

Fortuna et al, "Robust Header Compression in 4G Networks with QoS Support", 2005 IEEE 16th International Symposium on Personal, Indoor and Mobile Radio Communications, 2005, pp. 1835-1839.

Van Jacobson,. "Compressing TCP/IP Headers for Low-Speed Serial Links", IETF RFC 1144, IETF Network Working Group, Feb. 1990.

Degermark et al, IP Header Compression. IETF RFC 2507, IETF Network Working Group, Feb. 1999.

Casner et al,. Compressing IP/UDP/RTP Headers for Low-Speed Serial Links. IETF RFC 2508, IETF Network Working Group, Feb. 1999.

Koren et al, Enhanced Compressed RTP (CRTP) for Links with High Delay, Packet Loss and Reordering. IETF RFC 3545, IETF Network Working Group, Jul. 2003.

Bormann et al, RObust Header Compression (ROHC): Framework and four profiles: RTP, UDP, ESP and uncompressed. IETF RFC 3095, Apr. 2001.

Jonsson et al, RObust Header Compression (ROHC): A compression profile for IP, IETF RFC 3843, Jun. 2004.

Pelletier, RObust Header Compression (ROHC): Profiles for UDP-Lite, IETF RFC 4019, Apr. 2005.

Bormann, Robust Header Compression (ROHC) over PPP, IETF RFC 3241, Apr. 2002.

Pelletier et al, Robust Header Compression (ROHC): A Profile for TCP/IP (ROHC-TCP), RFC 4996, Jul. 2007.

Pelletier, Proposal for Invention Disclosures—Many Slides Secure RoHC, Internal Limited Slideware Presentation supporting this document, Apr. 2006.

Pelletier et al, The Robust Header Compression (ROHC) Framework, RFC 4995, Jul. 2007.

Baugher et al., The Secure Real-time Transport Protocol (SRTP), IETF RFC 3711, Mar. 2004.

Price et al., Signalling Compression (SigComp), IETF RFC 3320, Jan. 2003.

Pereira, IP Payload Compression Using DEFLATE, IETF RFC 2394, Dec. 1998.

Friend et al, IP Payload Compression Using LZS, IETF RFC 2395, Dec. 1998.

Pelletier et al, Robust Header Compression Version 2 (ROHCv2): Profiles for RTP, UDP, IP, ESP and UDP-Lite.

Pelletier et al, Robust Header Compression (ROHC): ROHC over Channels that can reorder packets, IETF RFC 4224, Jan. 2006.

M. Degermark, et al., "IP Header Compression," Standards Track, RFC 2507, Feb. 1999.

Chinese Office Action issued in Application No. 200780032178.2, dated Oct. 10, 2012 with English Translation.

* cited by examiner

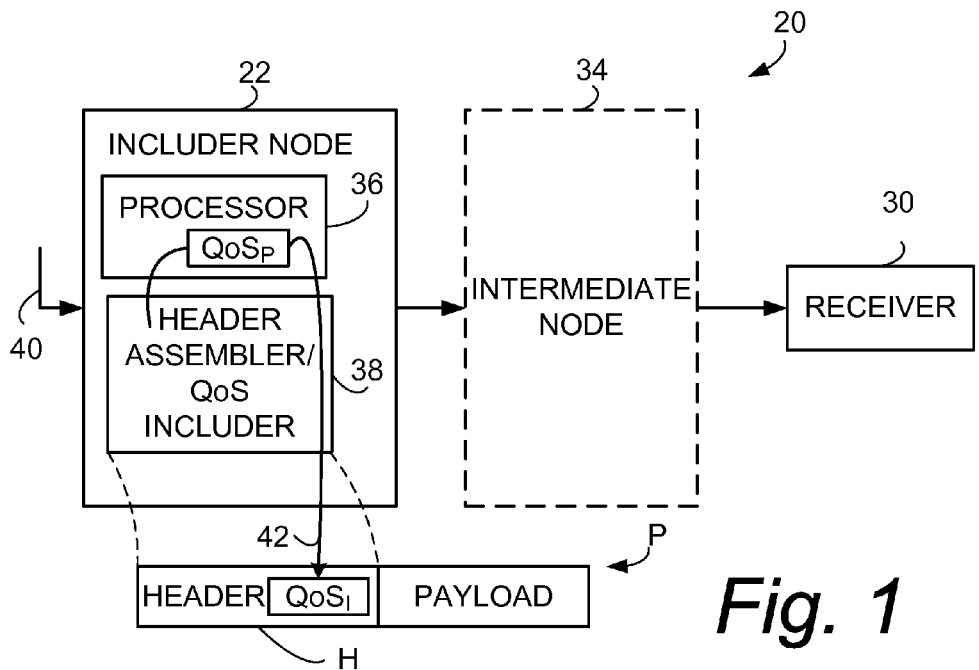

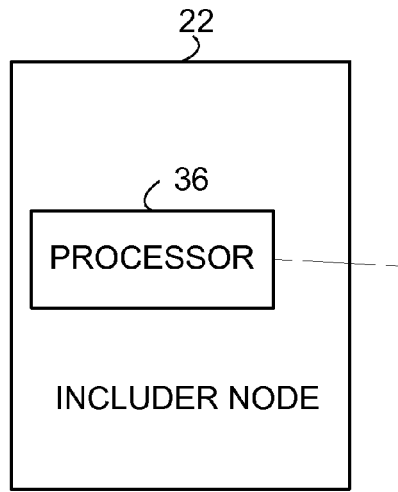

PROCESSOR PERFORMS ONE OR MORE PROCESSES HAVING PROCESS-ASSOCIATED QoS REQUIREMENT:
- HEADER COMPRESSION
- PAYLOAD COMPRESSION
- SIGNALING COMPRESSION
- ENCRYPTION
- AUTHENTICATION
- CHECKSUMMING FOR VERIFICATION
- SEQUENCING

Fig. 2

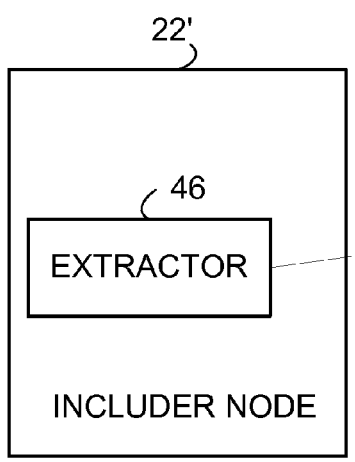

EXTRACTOR CAN OBTAIN EXTRACTED QoS INFORMATION FROM:
- APPLICATION LAYER
- APPLICATION TRANSPORT PROTOCOL
- TRANSPORT PROTOCOL
- NETWORK PROTOCOL

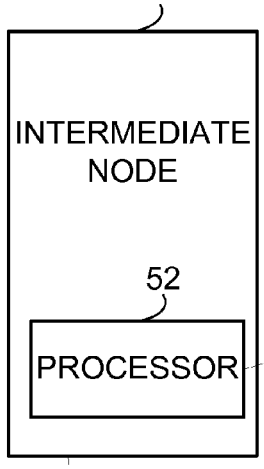

34" INTERMEDIATE NODE

52 PROCESSOR

PROCESSOR PERFORMS ONE OR MORE INTERMEDIATE NODE FUNCTIONS:
- QUEUE MANAGEMENT FUNCTION
- SCHEDULING FUNCTION
- POWER SETTING FUNCTION
- TARGET NUMBER OF TRANSMISSIONS FUNCTION
- HYBRID AUTOMATIC REPEAT REQUEST (HARQ) FUNCTION
- BIT ERROR RATE (BER) FUNCTION
- SEGMENTATION AND CONCATENATION FUNCTION
- MULTI-USER FRAME FUNCTION

INTERMEDIATE NODE OPERATES IN DIFFERENT SCENARIOS:
- FOR EACH OF PLURAL PROCESSED PACKETS OF A SAME PACKET FLOW, USING THE HEADER-INCLUDED QUALITY OF SERVICE INFORMATION INCLUDED IN THE COMPRESSED HEADER OF A RESPECTIVE PROCESSED PACKET BEARING THE HEADER-INCLUDED QUALITY OF SERVICE INFORMATION WHEN PERFORMING THE INTERMEDIATE NODE FUNCTION FOR THE RESPECTIVE PROCESSED PACKET
- FOR EACH OF PLURAL PROCESSED PACKETS BELONGING TO DIFFERENT PACKET FLOWS FOR A SAME USER, USING THE HEADER-INCLUDED QUALITY OF SERVICE INFORMATION INCLUDED IN THE COMPRESSED HEADER OF A RESPECTIVE PROCESSED PACKET BEARING THE HEADER-INCLUDED QUALITY OF SERVICE INFORMATION WHEN PERFORMING THE INTERMEDIATE NODE FUNCTION FOR THE RESPECTIVE PROCESSED PACKET
- USING THE HEADER-INCLUDED QUALITY OF SERVICE INFORMATION INCLUDED IN THE COMPRESSED HEADER WHEN PERFORMING THE INTERMEDIATE NODE FUNCTION FOR A PROCESSED PACKET DESTINED FOR PLURAL USERS

INCLUSION OF QUALITY OF SERVICE INDICATION IN HEADER COMPRESSION CHANNEL

This application claims the benefit and priority of U.S. provisional patent application 60/824,242, filed Aug. 31, 2006, entitled "METHODS FOR COMBINING QUALITY OF SERVICE (QoS) AND HEADER COMPRESSION CHANNEL", which is incorporated by reference herein in its entirety.

BACKGROUND

I. Technical Field

This technology pertains to wireless communications, and particularly to compression of packet headers transmitted in a radio access network.

II. Related Art and Other Considerations

Due to the tremendous success of the Internet, it has become a challenging task to make use of the Internet Protocol (IP) over all kinds of links. However, because of the fact that the headers of the IP protocols are rather large, it is not always a simple task to make this come true for narrow band links, for example wireless cellular links. As an example, consider ordinary speech data transported by the protocols (IP, UDP, RTP) used for Voice-over-IP (VoIP), where the header may represent about 70% of the packet—resulting in a very inefficient usage of the link.

The term header compression (HC) comprises the art of minimizing the necessary bandwidth for information carried in headers on a per-hop basis over point-to-point links. The techniques in general have a more than ten-year-old history within the Internet community; several commonly used protocols exist such as RFC 1144 (VJ) Van Jacobson, *Compressing TCP/IP Headers for Low-Speed Serial Links*, IETF RFC 1144, IETF Network Working Group, February 1990; RFC 2507 (IPHC) Mikael Degermark, Björn Nordgren, Stephen Pink. *IP Header Compression*. IETF RFC 2507, IETF Network Working Group, February 1999; and RFC 2508 (CRTP) Steven Casner, Van Jacobson. *Compressing IP/UDP/RTP Headers for Low-Speed Serial Links*, IETF RFC 2508, IETF Network Working Group, February 1999.

Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is thus an important component to make IP services over wireless, such as voice and video services, economically feasible. Header compression solutions have been developed by the Robust Header Compression (ROHC) Working Group of the IETF to improve the efficiency of such services.

Other optimizations, such as other types of compression, can also be used to further increase the performance of bandwidth-limited systems. These include payload compression [see, e.g., Pereira, R., *IP Payload Compression Using DEFLATE*, IETF RFC 2394, December 1998; and Friend, R. et R. Monsour, *IP Payload Compression Using LZS*, IETF RFC 2395, December 1998]; signaling compression [see, e.g., Baugher M. et al., *The Secure Real-time Transport Protocol (SRTP)*, IETF RFC 3711, March 2004]; header removal and regeneration, and header compression [see, e.g., RFC 1144 (VJ) Van Jacobson, *Compressing TCP/IP Headers for Low-Speed Serial Links*, IETF RFC 1144, IETF Network Working Group, February 1990; RFC 2507 (IPHC) Mikael Degermark, Björn Nordgren, Stephen Pink. *IP Header Compression*, IETF RFC 2507, IETF Network Working Group, February 1999; RFC 2508 (CRTP) Steven Casner, Van Jacobson, *Compressing IP/UDP/RTP Headers for Low-Speed Serial Links*, IETF RFC 2508, IETF Network Working Group, February 1999; Koren, T., Casner, S., Geevarghese, J., Thompson B. and P. Ruddy, *Enhanced Compressed RTP (CRTP) for Links with High Delay, Packet Loss and Reordering*. IETF RFC 3545, IETF Network Working Group, July 2003; Carsten Bormann, et al. *RObust Header Compression (ROHC). Framework and four profiles. RTP, UDP, ESP and uncompressed*. IETF RFC 3095, April 2001); Jonsson, L. and G. Pelletier, *RObust Header Compression (ROHC). A compression profile for IP*, IETF RFC 3843, June 2004; Pelletier, G., *RObust Header Compression (ROHC). Profiles for UDP-Lite*, IETF RFC 4019, April 2005; Pelletier, G., Sandlund, K. and L. Jonsson, *Robust Header Compression (ROHC). A Profile or TCP/IP*, Internet Draft (work in progress), <RFC4996, July 2007 http://tools.ietf.org/rfc/rfc4996.txt>, June 2006; and Pelletier, G. et Sandlund, K., *Robust Header Compression Version 2 (ROHCv2). Profiles for RTP, UDP, IP, ESP and UDP-Lite*, Internet Draft (work in progress), draft-pelletier-rohc-rohcv2-profiles-01.txt, May 2007 http://tools.ietf.org/id/draft-ietf-rohc-rfc3095bis-rohcv2-profiles-01.txt, June 2006. All the foregoing are incorporated herein by reference in their entirety. Any of these types of compression may be designed to make use of sequence numbers and checksums.

Traditionally, the UTRAN architecture has separated functionalities into different nodes as follows: the Radio Network Control (RNC) function handles sequencing when lossless relocation is supported (optional). The ciphering (e.g., encryption) occurs in the NodeB (i.e. radio base station transmitter), and requires in-order delivery of each Service Data Units (SDUs) to maintain the ciphering context. In order to ensure that the ciphering does not loose synchronization, a Layer 2 (L2) Frame Checksum Sequence (FCS) is normally used, adding additional octets for transmission over the air interface. The decision about what quality of service would be applied to a packet is mainly performed in the RNC, while it is enforced at the transmission point, the NodeB.

The state-of-the-art in terms of QoS in wireless systems is to first establish a Radio Bearer (RB) (or "connection") for a specific service, for one or more combinations of e.g. IP source and destination addresses, UDP source and destination ports. The RB includes a set of parameters or traffic handling requirement that the transmitter should fulfill. This same processing is applied for any packet belonging to that service and being routed to the same RB, independently of other possible QoS differentiation. Packets belonging to the same service may be "routed" to different radio bearers by some selector process, but this is done independently from the transmitter state (queue managements, scheduling, CIR, cell load and other possible factors that could influence the treatment of a packet) and not in the transmitting node, as the RB edges are not located in the transmitting node per definition.

The above limits the NodeB in its capability to adjust its transmission mechanisms, e.g. Hybrid Automatic Retransmission reQuest (H-ARQ), scheduling and queue management, to a finer granularity for each packet and also between multiple receivers being served within a cell. The NodeB is often limited to its static knowledge of the radio bearer (i.e. the connection) and of the QoS parameters associated to it and to which the SDU belongs to, and possibly from some other information propagated over the (standardized) interface between the RNC and the NodeB associated to the packet. Some NodeBs may inspect the SDU before transmission to try to extract further information, however little is available as SDUs at this point have already been processed by e.g. header compression and/or encryption functions.

In contrast, the current proposal for the SAE/LTE architecture is to remove the RNC, which leads to that the ciphering function and the PDCP function, which hosts the header compression function, are now located in the same node (access gateway—aGW). Both the ciphering and the PDCP functions terminate into the User Equipment (UE) on the other end. In other words, the interface between the aGW node and the eNB node is deemed to be untrusted. The S1 interface thus requires that ciphering be applied to the user traffic, and this propagates up to the user equipment unit (UE). A secure tunnel over the S1 interface would not solve the problem of trust of the eNB node. Finally, the mapping of the QoS to radio bearer (i.e. connection) remains, as the limitations attached to it.

Often QoS is defined in a connection-oriented fashion (per flow/receiver or per physical channel), or because the traditional distribution of functions (e.g. encryption and header compression) prevents this combination. Such traditional definition/usage of QoS is illustrated by FIG. 16. In FIG. 16, the L2 ciphering traditionally occurs in a different node than that where the enforcement of the QoS occurs, i.e., the entire compressed header is encrypted.

Header compression "hides" the QoS information carried in upper layers, while it adds its own "sensibility" to how individual header compressed packets are QoS handled. The same applies with security. As shown in FIG. 17, the state-of-the-art often uses an interface between the L2 and upper layers, and when multiple L2 are traversed, each L2 has to interface with each other to translate the QoS requirement of each packet.

One problem is how to derive and how to propagate the QoS information that is the most suitable for a Protocol Data Unit (PDU), and how this information can be propagated to the transmitter so that more flexible algorithms to enforce QoS requirements may be implemented. Traditionally, this has not been possible to do within the header compression channel, as functions where often separated into different physical nodes and "interfering" with each other.

SUMMARY

The technology generally concerns methods, apparatus, systems, and techniques to derive, include, and propagate Quality of Service (QoS) information found in headers and/or payload of upper protocol layers (IP protocols) for a Protocol Data Units (PDU), or information related to optimization algorithms applied to the PDU, within the header compression channel (e.g. RoHC).

In one of its aspects the present technology concerns a packet handling method for a telecommunications system. A basic mode of the method comprises (1) processing a packet using a process having a process-associated quality of service requirement to form a processed packet and (2) including, with a compressed header for the processed packet, header-included quality of service information which is derived using information indicative of the process-associated quality of service requirement.

An example implementation of the basic mode further comprises including the header-included quality of service information in a channel part of the compressed header of the processed packet. The process having the process-associated quality of service requirement can comprise at least one of the following: header compression; payload compression; signaling compression; encryption; authentication; checksumming for verification; and sequencing. The basic mode can be performed at a network node such as an access gateway node.

A second mode of the method further comprises extracting quality of service information from a received packet and deriving the header-included quality of service information using both the quality of service information extracted from the received packet and the information indicative of the process-associated quality of service requirement. In an example implementation, the extracted quality of service information can be supplied by a network layer or higher layer of the telecommunications system. The quality of service information can be extracted or deduced from a received packet at a packet inspector of a network node (e.g., access gateway node). The received packet can comprise, for example, a Protocol Data Unit (PDU).

The acts of the first mode and the second mode can be performed at a first node of a network. A third mode of the method, usable with either the first mode or the second mode, further comprises using the header-included quality of service information to perform an intermediate node function at an intermediate node of the network. The intermediate node being intermediate the first node and a receiver. The first node can be, for example, an access gateway node.

In example implementations, the intermediate node function can be at least one of the following: a queue management function; a scheduling function; a power setting function; a target number of transmissions function; a hybrid automatic repeat request (HARQ) function; a bit error rate (BER) function; a segmentation and concatenation function; a multi-user frame function.

The third mode can operate in various scenarios. A first scenario of the third mode further comprises, for each of plural processed packets of a same packet flow (e.g., RoHC CID or radio bearer), using the header-included quality of service information included with the compressed header of a respective processed packet bearing the header-included quality of service information when performing the intermediate node function for the respective processed packet.

A second scenario of the third mode further comprises, for each of plural processed packets belonging to different packet flows for a same user, using the header-included quality of service information included with the compressed header of a respective processed packet bearing the header-included quality of service information when performing the intermediate node function for the respective processed packet A third scenario of the third mode further comprises, using the header-included quality of service information included with the compressed header when performing the intermediate node function for a processed packet destined for plural users Another aspect of the technology concerns a node of a telecommunications system which is configured to include, with a compressed header for a data packet handled by the node, header-included quality of service information derived using information indicative of a process-associated quality of service requirement of a process performed by the node.

In an example first embodiment, the node comprises a processor and a header assembler. The processor is configured to process the packet using the process having the process-associated quality of service requirement and to form a processed packet. The header assembler is configured to include, in the compressed header for the processed packet, the header-included quality of service information.

In an example second embodiment, the header-included quality of service information is derived by the node using both quality of service information supplied by a network layer or higher layer of the telecommunications system and information indicative of a process-associated quality of service requirement of a process performed by the node. In an example implementation of the second embodiment, the node further comprises an extractor configured to extract the quality of service information from a received packet.

In accordance with either the first example embodiment or the second example embodiment, the node is configured to include the combined quality of service information in a channel part of the compressed header of the processed packet.

In accordance with either the first example embodiment or the second example embodiment, the process having the process-associated quality of service requirement can comprise at least one of the following: header compression; payload compression; signaling compression; encryption; authentication; checksumming for verification; and sequencing.

In accordance with either the first example embodiment or the second example embodiment, the node can be an access gateway node.

Another aspect of the technology concerns an intermediate node of a telecommunications system which is configured to handles a flow of data packets traveling from another node to a receiver. In an example embodiment, the intermediate node comprises a packet inspector and a processor. The packet inspector is configured to inspect a channel part of a compressed header of a packet received from the other node to obtain quality of service information for the packet. The processor is configured to perform a function at a sub-flow granularity level using the combined quality of service information of the packet.

In example embodiments, the function of the intermediate node can be at least one of the following: a queue management function; a scheduling function; a power setting function; a target number of transmissions function; a hybrid automatic repeat request (HARQ) function; a bit error rate (BER) function; a segmentation and concatenation function; a multi-user frame function The processor of the intermediate node can be configured to operate upon various scenarios. For a first scenario, the processor of the intermediate node is configured to use, for each of plural processed packets of a same packet flow (e.g., RoHC CID or radio bearer), the quality of service information included with the compressed header of a respective packet bearing the combined quality of service information when performing the function for the respective packet For a second scenario, the processor of the intermediate node is configured to use, for each of plural processed packets belonging to different packet flows for a same user, the quality of service information included with the compressed header of a respective packet bearing the combined quality of service information when performing the intermediate node function for the respective packet.

For a third scenario, the processor of the intermediate node is configured to use the quality of service information included with the compressed header when performing the function for a packet destined for plural users.

Preferably, the processor of the intermediate node is configured to use the quality of service information included with the compressed header to perform the function at a per-packet granularity level.

In another of its aspects, the technology further concerns a method of operating an intermediate node of a telecommunications system which handles a flow of data packets. The intermediate node operation method basically comprises (1) inspecting a channel part of a compressed header of a packet received from another node to obtain quality of service information for the packet; and (2) performing a function at a sub-flow granularity level using the combined quality of service information of the packet.

The function of the intermediate node operation method can be at least one of the following: a queue management function; a scheduling function; a power setting function; a target number of transmissions function; a hybrid automatic repeat request (HARQ) function; a bit error rate (BER) function; a segmentation and concatenation function; a multi-user frame function The intermediate node operation method can operate in various scenarios. A first scenario of the intermediate node operation method further comprises using, for each of plural processed packets of a same packet flow (e.g., RoHC CID or radio bearer), the quality of service information included with the compressed header of a respective packet bearing the combined quality of service information when performing the function for the respective packet A second scenario of the intermediate node operation method further comprises using, for each of plural processed packets belonging to different packet flows for a same user, the quality of service information included with the compressed header of a respective packet bearing the combined quality of service information when performing the intermediate node function for the respective packet A third scenario of the intermediate node operation method further comprises using the quality of service information included with the compressed header when performing the function for a packet destined for plural users The intermediate node operation method preferably further comprises performing the function at a per-packet granularity level using the combined quality of service information of the packet.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of an example first embodiment of a telecommunications system which facilitates inclusion of quality of service information in a header compression channel.

FIG. 2 is a diagrammatic view illustrating example processes which can be performed by a processor of an includer node.

FIG. 3 is a flowchart illustrating basic, representative acts, steps, or events involved in a first mode of a method of operating a telecommunications system or a node thereof.

FIG. 7 is a diagrammatic view illustrating from which layers or protocols an extracted quality of service information can be obtained

FIG. 10 is a diagrammatic view illustrating both example functions performed by an intermediate node processor and various scenarios of operation for an intermediate node.

DETAILED DESCRIPTION

Figure 4A:
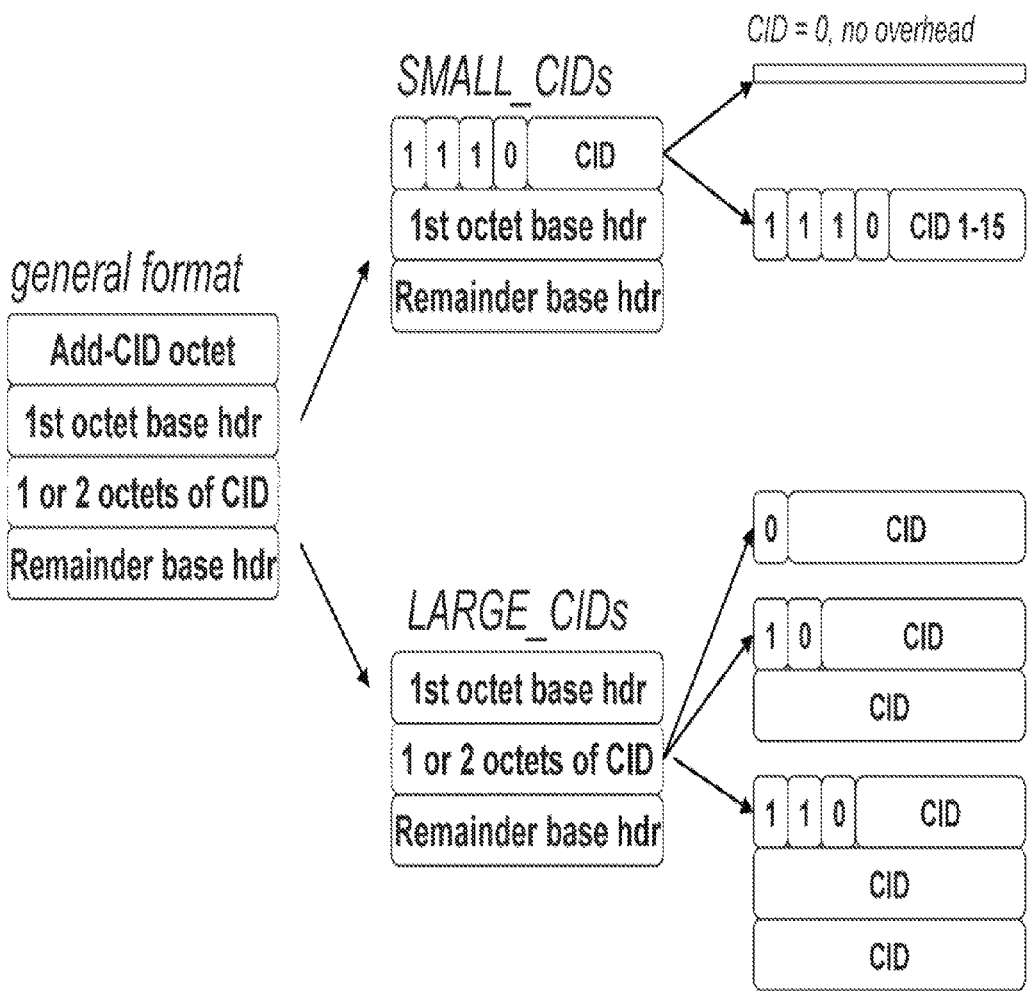
FIG. 4A is a diagrammatic illustrating header formats for accommodating CID information.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

FIG. 1 shows an example first embodiment of a telecommunications system 20 which facilitates inclusion of quality of service (QoS) information in a header compression channel. The telecommunications system 20 comprises node 22 which handles a flow of data packets and which accomplishes inclusion of quality of service (QoS) information in a header compression channel for the data packets, as well as a packet receiver 30 to which the flow of packets is directed. For sake of nomenclature, node 22 is also referred to as "includer node" 22. An optional intermediate node 34 may be located between includer node 22 and receiver 30. The optional nature of intermediate node 34 is depicted by its broken line representation in FIG. 1.

In example implementations, the packet receiver 30 is preferably but not exclusively a wireless terminal, e.g., a station, node, or terminal which connects over an air or radio interface to a radio access network (RAN) which includes the includer node 22. The wireless terminal can be called by other names and comprise different types of equipment. For example, the wireless terminal can also be called a mobile station, wireless station, or user equipment units (UEs), and can be equipment such as mobile telephones ("cellular" telephones) and laptops with mobile termination, and thus can be, for example, portable, pocket, hand-held, computer-included, or car-mounted mobile devices which communicate voice and/or data with radio access network.

The includer node 22 comprises processor 36 and header assembler 38. The header assembler 38 serves, e.g., as a quality of service (QoS) includer. As indicated by arrow 40, includer node 22 receives data packets comprising a flow of data packets from an upstream source. A received data packet can be, e.g., a Protocol Data Unit (PDU) or Internet Protocol packet, for example. The processor 36 of includer node 22 can perform or execute one or more processes in conjunction with a received data packet. Example processes performed by processor 36 of includer node 22 are illustrated in FIG. 2, and can comprise at least one of the following: header compression; payload compression; signaling compression; encryption; authentication; checksumming for verification; and sequencing.

The process performed by processor 36 can include, involve, or impute a process-associated quality of service requirement to a packet which is used in, involved in, or results from the process. FIG. 1 generally depicts the process-associated quality of service requirement $QoS_P$. The quality of service requirement involved depends on the nature of the process. Table 1 includes a non-exclusive list of QoS information that can often be relevant for the transmission of a data packet, when the process performed by processor 36 is a header compression algorithm.

TABLE 1

Header compression related "QoS"

| Type of QoC Information | Example(s) |
| --- | --- |
| initialization of new context | (e.g. RoHC IR packet type) |
| Significant update | (e.g. RoHC packets updating control fields) |
| Recovery mechanisms | (e.g. from reception of RoHC feedback) |
| Reordering tolerance | (e.g. RoHC window-based least significant bit (w-lsb) encoding and optimistic approach limitations) |
| Robustness characteristics of algorithm | (e.g. RoHC vs eCRTP, RoHC R-mode vs U/O-mode, optimistic approach strategies) |
| Updating properties | (e.g. RoHC operational modes) |
| packet types | (e.g. RoHC PT-0) |

Example QoS information that can be relevant for the transmission of a data packet when the process performed by processor 36 is a security-related (e.g., encryption) process can be, for example, a master key utilized for resynchronization.

Thus, in the example first embodiment of FIG. 1, the processor 36 of includer node 22 is configured to process the packet using the process having the process-associated quality of service requirement $QoS_P$ and to form a processed packet. Header assembler 38 constructs a header H for a header-compressed packet P so that the header H includes header-included quality of service information (depicted as $QoS_I$). The header-included quality of service information $QoS_I$ is derived from (e.g., is the same is, or is related to) the process-associated quality of service requirement $QoS_P$. As shown by arrow 42 in FIG. 1, the header assembler 38 includes, with the compressed header for the processed packet, the header-included quality of service information $QoS_I$.

FIG. 3 illustrates basic, representative acts, steps, or events involved in a first mode of a method of the technology. The first mode is also known as a basic mode, since acts of the first mode can also be included in further modes described herein. The first mode can be performed by the includer node 22 such as that of the first embodiment of FIG. 1. For example, the basic mode can be performed at a network node such as an access gateway node.

Act 3-1 of the first mode involves processing a packet using a process having a process-associated quality of service requirement (e.g., process-associated quality of service requirement $QoS_P$) to form a processed packet. The process involved in act 3-1 can be depicted by the process performed by processor 36 of FIG. 1 and be any of the processes illustrated by FIG. 2, for example (header compression; payload compression; signaling compression; encryption; authentication; checksumming for verification; and sequencing).

Act 3-2 of the first mode comprises including, with a compressed header H for the processed packet, the header-included quality of service information $QoS_I$ which is derived using information indicative of the process-associated quality of service requirement ($QoS_P$). In an example implementation, act 3-2 can be performed by header assembler 38 of includer node 22 of FIG. 1.

The header-included quality of service information $QoS_I$ can be included in the header H in any suitable manner. For example, the header-included quality of service information $QoS_I$ can be added as an "add-QoS octet" in analogous manner to the conventionally known "add-CID octet" of an RoHC channel header.

In the above regard, a RoHC packet has a general format that includes the following elements: a payload, a header; feedback element(s); and variable length padding. RoHC uses a context identifier (CID) to associate compressed headers to a relevant state. The CID provides a mechanism for a RoHC channel to transport multiple header-compressed flows. The header has two formats: large_CID format and small_CID format. Both formats are illustrated by FIG. 4A. The header either: (1) does not carry any CID information (indicating a CID of zero); or (2) includes one Add-CID octet (see the SMALL-CID illustration in FIG. 4A); or (3) contains embedded CID information of one or two octets in length (see the LARGE-CID illustration in FIG. 4A). Alternatives (1) and (2) above apply only to compressed headers in channels where the CID space is small. Alternative (3) above applies only to compressed headers in channels where the CID space is large.

Figure 4B:
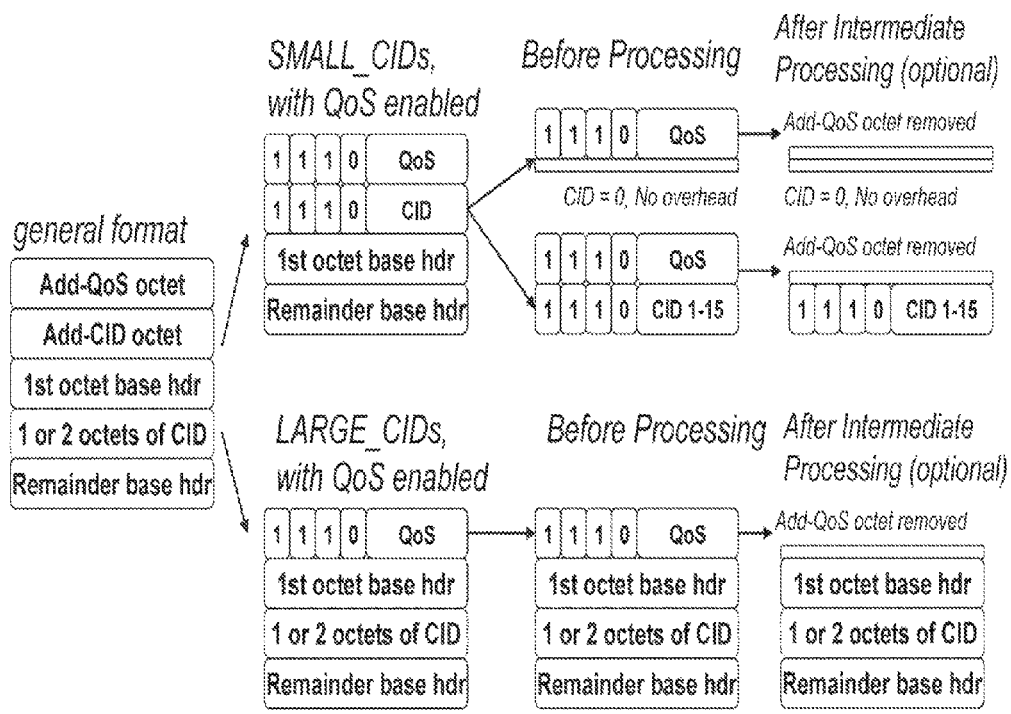
FIG. 4B is a diagrammatic illustrating header formats for accommodating quality of service information.

In similar manner as with the "add-CID octet" described above and illustrated in FIG. 4A, the header assembler 38 can, in an example embodiment, include the header-included quality of service information $QoS_I$ by in the header H by forming an add-QoS octet in the manner illustrated in FIG. 4B. In other words, the RoHC general packet format can be modified to include the add-QoS octet to indicate different QoS levels to differentiate packets from each other. FIG. 4B illustrates how such an add-QoS octet can be added relative to the RoHC general format, as well as to each of the SMALL-CID format and LARGE_CID format. Using the example of the add-QoS octet, as many as sixteen different levels of quality of service can be facilitated for describing the header-included quality of service information $QoS_I$.

Figure 5:
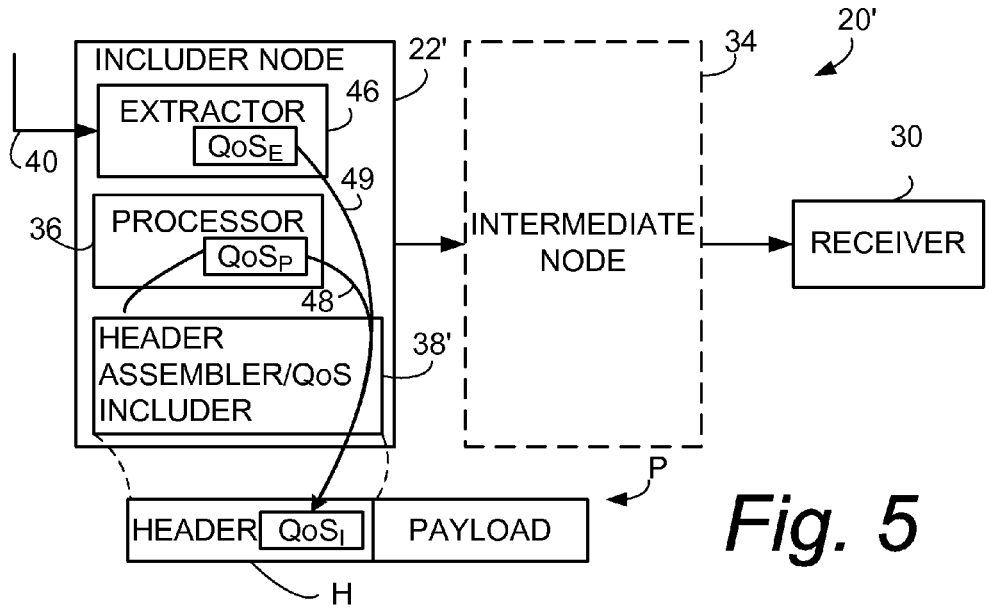
FIG. 5 is a diagrammatic view of a second example embodiment of a telecommunications system which facilitates inclusion of quality of service information in a header compression channel.

FIG. 5 shows a second example embodiment of a telecommunications system 20' which facilitates inclusion of quality of service (QoS) information in a header compression channel. The telecommunications system 20' comprises includer node 22' which handles a flow of data packets toward receiver 30, and an optional intermediate node 34. As with the includer node 22 of FIG. 1, includer node 22' comprises processor 36 and header assembler 38'. In addition, includer node 22' comprises extractor 46. The extractor 46 is configured to extract certain quality of service information already included in or associated with a received packet, e.g., associated with a flow for a received packet. Typically such quality of service information extracted by extractor 46 is quality of service information supplied by a network layer or higher layer of the telecommunications system. Such quality of service information extracted by extractor 46 is herein known as "extracted quality of service information $QoS_E$" and so depicted in FIG. 5.

In the second example embodiment of FIG. 5, header assembler 38' derives the header-included quality of service information $QoS_I$ using both the process-associated quality of service requirement $QoS_P$ as obtained from processor 36 and the extracted quality of service information $QoS_E$ obtained from extractor 46. To this end FIG. 5 illustrates by arrow 48 the header assembler 38' obtaining the process-associated quality of service requirement $QoS_P$ from processor 36 and by arrow 49 the header assembler 38' obtaining the extracted quality of service information $QoS_E$ from extractor 46. The header assembler 38' uses both the process-associated quality of service requirement $QoS_P$ and the extracted quality of service information $QoS_E$ to derive the header-included quality of service information $QoS_I$ which is included or inserted in the header H of the header-compressed packet. In some sense, the header-included quality of service information $QoS_I$ represents "combined" quality of service information since its contents or value depends on both extracted quality of service information $QoS_E$ and process-associated quality of service requirement $QoS_P$.

The header-included quality of service information $QoS_I$ can be derived from both process-associated quality of service requirement $QoS_P$ and extracted quality of service information $QoS_E$ in various ways. For example, in a situation in which a first value represents the process-associated quality of service requirement $QoS_P$ and a second value represents the extracted quality of service information $QoS_E$, the two values can be used as indices to obtain (e.g., from a look up table) a value that represents the derived header-included quality of service information $QoS_I$. In other words, each combination of two input values (one input corresponding to the process-associated quality of service requirement $QoS_P$ and another input corresponding to the extracted quality of service information $QoS_E$) can be used to obtain an output header-included quality of service information $QoS_I$ value.

Figure 6:
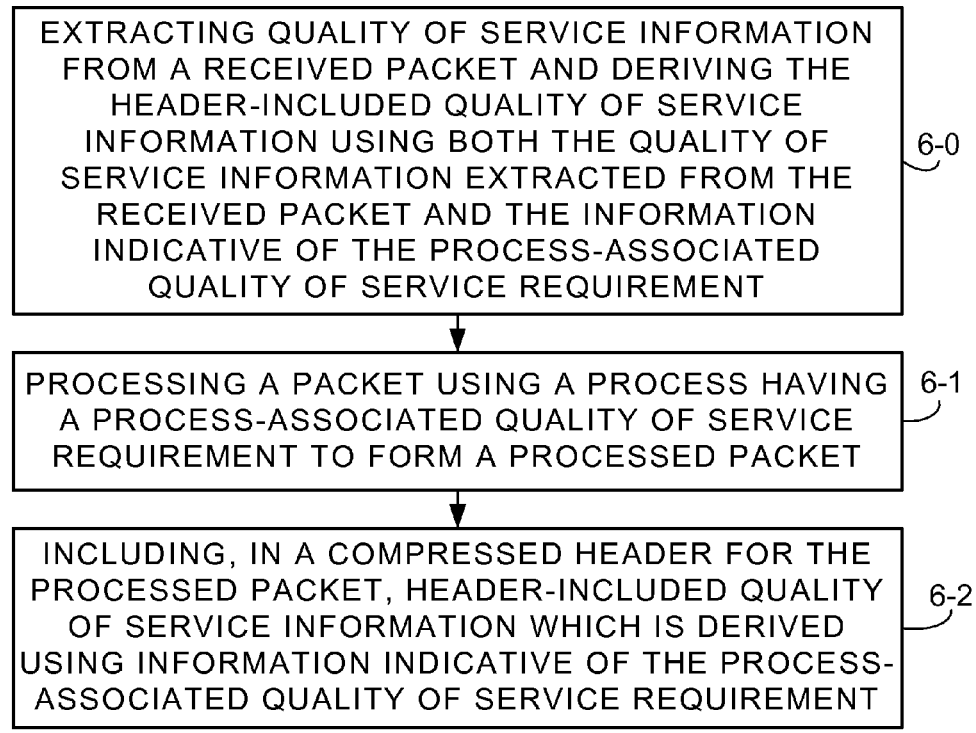
FIG. 6 is a flowchart illustrating basic, representative acts, steps, or events involved in a second mode of a method of operating a telecommunications system or a node.

FIG. 6 illustrates basic, representative acts, steps, or events involved in a second mode of a method of the technology. Act 6-0 of the second mode comprises extracting quality of service information from a received packet. As understood with reference to FIG. 5, act 6-1 can be performed by extractor 46 to obtain extracted quality of service information $QoS_E$. Act 6-1 of FIG. 6 is similar to act 3-1 in that it comprises processing a packet using a process having a process-associated quality of service requirement (e.g., process-associated quality of service requirement $QoS_P$) to form a processed packet. The process involved in act 6-1 can be depicted by the process performed by processor 36 of FIG. 6 and be any of the processes illustrated by FIG. 2, for example (header compression; payload compression; signaling compression; encryption; authentication; checksumming for verification; and sequencing). Act 6-2 of the second mode comprises deriving the header-included quality of service information $QoS_I$ using both the quality of service information extracted from the received packet and the information indicative of the process-associated quality of service requirement. The header-included quality of service information $QoS_I$ can be derived (e.g., using a combination of process-associated quality of service requirement $QoS_P$ and extracted quality of service information $QoS_E$) in the manner described above an inserted or included in the header H as shown in FIG. 5.

FIG. 7 illustrates from which layers or protocols the extracted quality of service information $QoS_E$ can be obtained, e.g., from the application layer, from the application transport layer protocol, from the transport protocol, or from the network protocol. Indeed, different flows may have different QoS requirements between each other, for the same destination (e.g., the same receiver, the same user). Different destinations may have different QoS requirements between each other. How the QoS requirements are enforced may in turn be impacted from the immediate radio conditions of receivers. These receivers, e.g. when a shared radio channel is used to serve multiple receivers, may contend between each other for the same resources. In addition, data packets may have different QoS requirements between each other, within the same flow (service).

Figure 8:
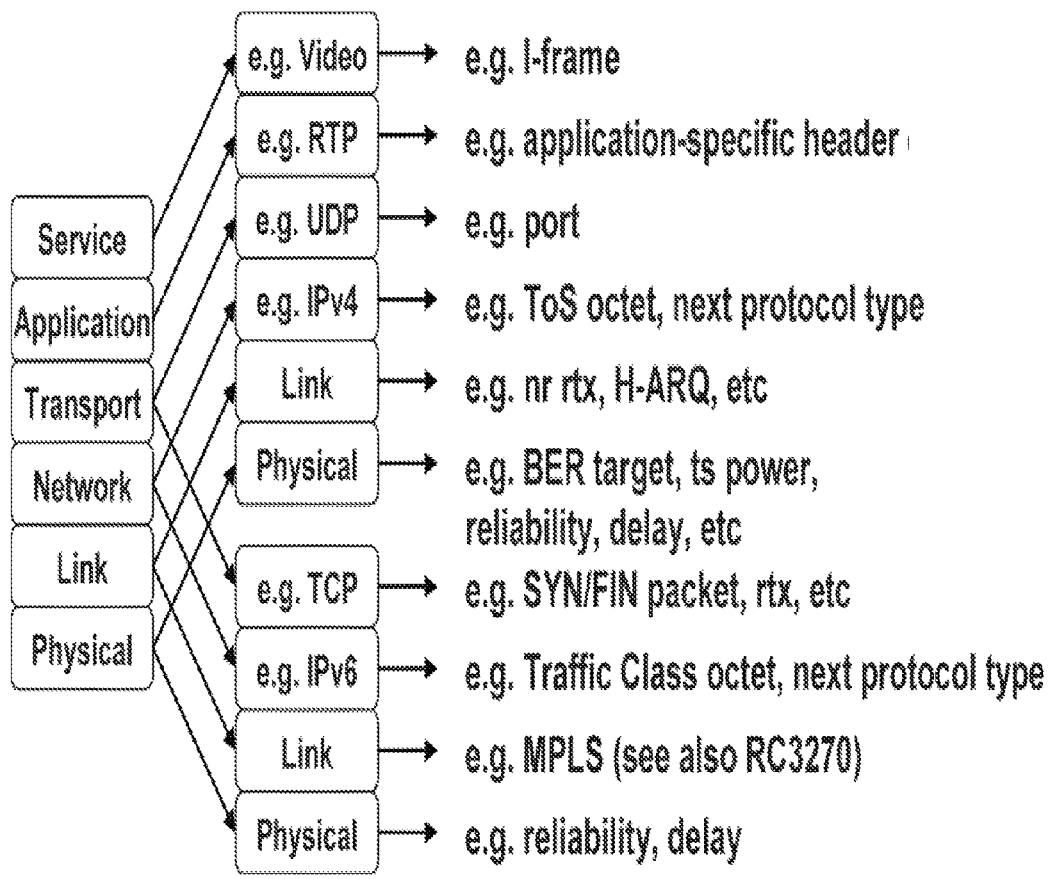
FIG. 8 is a diagrammatic view illustrating that quality of service information can be found at different layers within a data packet.

FIG. 8 illustrates that QoS information for use as the extracted quality of service information $QoS_E$ can be found at different layers within a data packet. Table 2 through and including Table 5 list a number of sources of QoS information that are often available within a data packet, each Table describing sources for one particular layer. Table 2 describes sources for Application layer-related Quality of Service (QoS); Table 3 describes sources for Application transport protocol related Quality of Service (QoS); Table 4 describes sources for Transport Protocol related Quality of Service (QoS); and Table 5 describes sources for Network protocol related Quality of Service (QoS).

TABLE 2

Application layer-related Quality of Service (QoS)

| | |
|---|---|
| service type | (e.g. streaming, real-time, single media, multimedia) |
| media type | (e.g. audio, video) |
| frame type | (e.g. RTP payload type, payload size) |
| marking | (e.g. RTP marker bit, beginning of spurt, end of frame) |
| frame dependency | (e.g. RTP extension header MPEG-2 beginning of slice) |

TABLE 3

Application transport protocol related Quality of Service (QoS)

| | |
|---|---|
| sequencing | (e.g. RTP sequence number) |
| timing | (e.g. RTP timestamp) |
| originating source | (e.g. call setup server) |

TABLE 4

Transport Protocol related Quality of Service (QoS)

| | |
|---|---|
| Type of stream | (e.g. UDP or TCP source/destination ports) |
| Type of data | (e.g. TCP FIN/SYN) |
| Recovery data | (e.g. TCP retransmission) |
| Feedback | (e.g. TCP ACK packet) |

TABLE 5

Network protocol related Quality of Service (QoS))

| | |
|---|---|
| traffic conditioning | (e.g. DS field in IPv4 Type of Service octet and IPv6 Trafic Class octet) |
| differentiated services | (e.g. ECN marking) |
| processing options | (e.g. IPv6 extension headers - hop-by-hop, destination options, fragment, encapsulating security payload) |
| medium reservation | (e.g. state established using e.g. RSVP, MPLS, DiffServ e.g. IETF RFC2597 and IETF RFC3246) |

Figure 9:
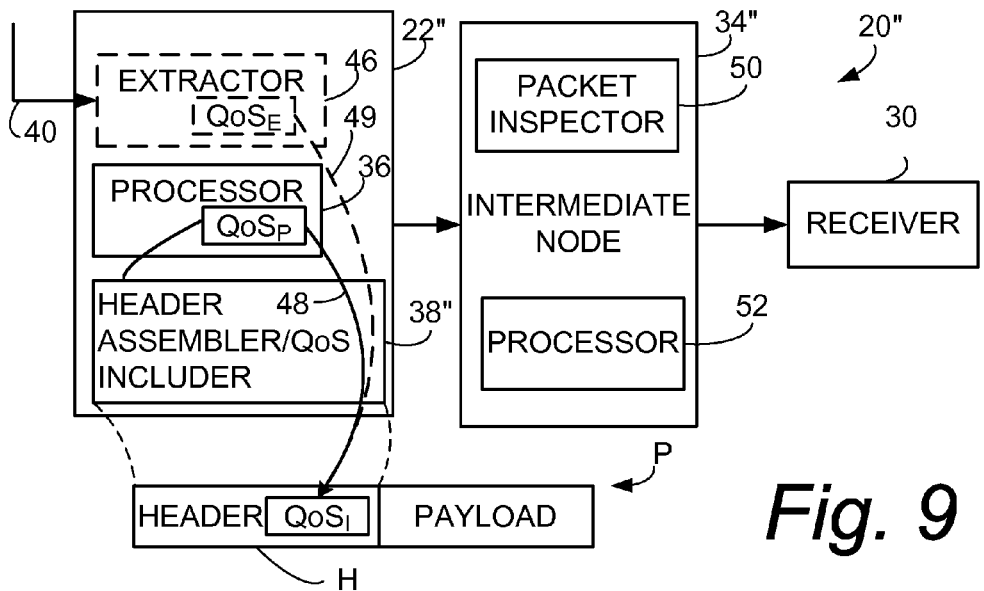
FIG. 9 is a diagrammatic view of a third example embodiment of a telecommunications system which facilitates inclusion of quality of service information in a header compression channel.

FIG. 9 shows a third example embodiment of a telecommunications system 20" which facilitates inclusion of quality of service (QoS) information in a header compression channel. The telecommunications system 20" comprises includer node 22" which handles a flow of data packets toward receiver 30, and intermediate node 34". As with the includer node 22 of FIG. 1, includer node 22" comprises processor 36 and header assembler 38". In addition, includer node 22" can optionally comprises extractor 46.

For the third embodiment of FIG. 9, header assembler 38" of includer node 22" can derive its header-included quality of service information $QoS_I$ either in the manner of the header assembler 38 of FIG. 1 (using the process-associated quality of service requirement $QoS_P$ without the extracted quality of service information $QoS_E$), or in the manner of header assembler 38' of FIG. 5 (using both the process-associated quality of service requirement $QoS_P$ and the extracted quality of service information $QoS_E$). Thus, in view of the its optional nature, extractor 46 is depicted by broken lines in FIG. 9.

For the third example embodiment, intermediate node 34" comprises a packet inspector 50 and an intermediate node processor 52. The packet inspector 50 is configured to inspect a header of a header-compressed packet received from another node (e.g., includer node 22") to obtain quality of service information for the packet. In particular, packet inspector 50 is configured to inspect a channel part of a compressed header of the packet received to obtain the quality of service information for the packet, e.g., the header-included quality of service information $QoS_I$.

The intermediate node processor 52 is configured to perform a function at a sub-flow granularity level (e.g., at a lower granularity than the packet flow itself, e.g., at a granularity of the packets themselves) using the combined quality of service information of the packet. As illustrated in FIG. 10, in example embodiments, the function of the intermediate node 34" as performed by intermediate node processor 52 can be at least one of the following: a queue management function; a scheduling function; a power setting function; a target number of transmissions function; a hybrid automatic repeat request (HARQ) function; a bit error rate (BER) function; a segmentation and concatenation function; a multi-user frame function. It will be appreciated that one or more such functions can be performed at intermediate nodes of other embodiments when such are employed.

Figure 11:
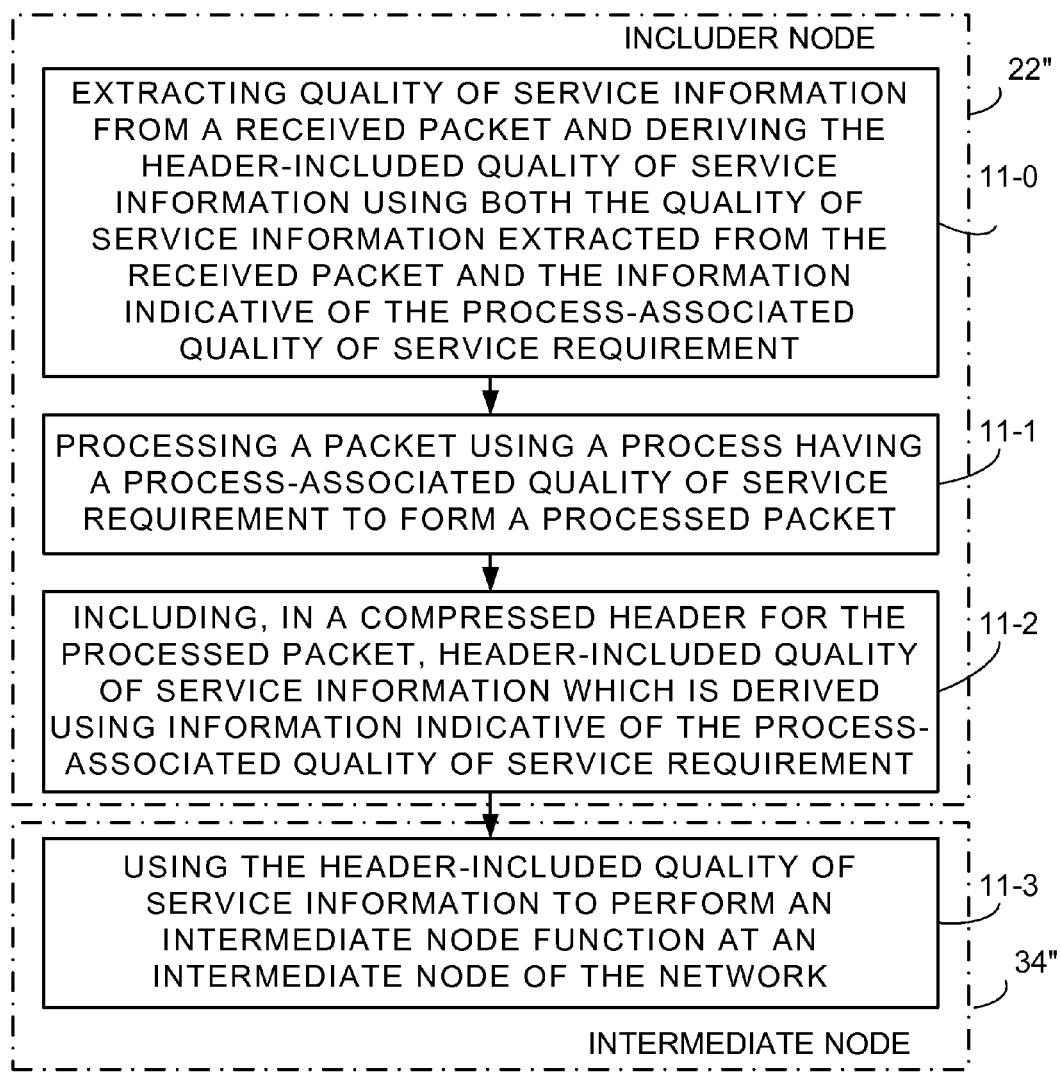
FIG. 11 is a flowchart illustrating basic, representative acts, steps, or events involved in a third mode of a method of operating a telecommunications system or a node.

FIG. 11 illustrates basic, representative acts, steps, or events involved in a third mode of a method of the technology. A third mode of the method can be used with either the first mode or the second mode. As indicated by the broken line framing the acts of FIG. 11, some of the acts of the third mode can be performed by includer node 22", other acts can be performed by intermediate node 34". The acts performed by includer node 22" can be performed either in the manner of FIG. 3 (e.g., similar to acts 3-1 and 3-2 of FIG. 3 in which only process-associated quality of service requirement $QoS_P$ is used to derive header-included quality of service information $QoS_I$), or can be performed in the manner of FIG. 6 (e.g., similar to acts 6-0 through 6-2 of FIG. 6 in which both extracted quality of service information $QoS_E$ and process-associated quality of service requirement $QoS_P$ are used to derive header-included quality of service information $QoS_I$). For sake of convenience, in FIG. 11 acts 11-0 through 11-2 correspond to those of the second mode (e.g., FIG. 6) in which both extracted quality of service information $QoS_E$ and process-associated quality of service requirement $QoS_P$ are used to derive header-included quality of service information $QoS_I$.

In the above regard, and as understood by reference to the preceding discussion of FIG. 6, act 11-0 of the third mode comprises extracting quality of service information from a received packet. Act 11-1 comprises processing a packet using a process having a process-associated quality of service requirement (e.g., process-associated quality of service requirement $QoS_P$) to form a processed packet. The process involved in act 11-1 can be any of the processes illustrated by FIG. 2, for example (header compression; payload compression; signaling compression; encryption; authentication; checksumming for verification; and sequencing). Act 11-2 of the third mode comprises deriving the header-included quality of service information $QoS_I$ (in the illustrated example by, e.g., using both the quality of service information extracted from the received packet and the information indicative of the process-associated quality of service requirement).

Act 11-3 of the third mode, performed by intermediate node 34", comprises using the header-included quality of service information (e.g., header-included quality of service information $QoS_I$) to perform an intermediate node function at the intermediate node 34. As indicated above, in example implementations the intermediate node function can be any of those shown in FIG. 11: a queue management function (e.g., active queue management [AQM] and dropping strategies); a scheduling function (delay threshold/CIR/round-robin/proportional fair); a power setting function; a target number of transmissions function; a hybrid automatic repeat request (HARQ) function; a bit error rate (BER) function; a segmentation and concatenation function; a multi-user frame function.

Figure 12:
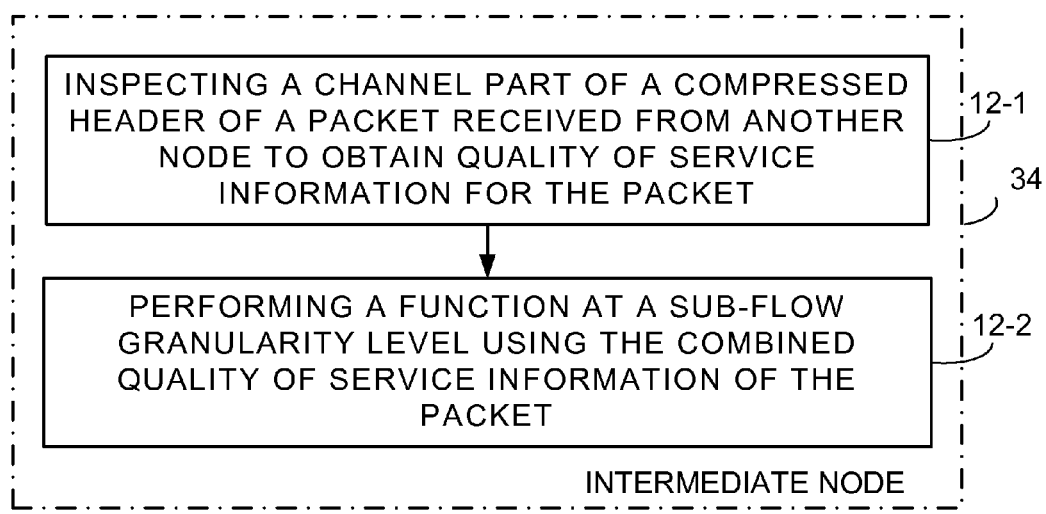
FIG. 12 is a flowchart illustrating basic, representative acts, steps, or events involved in a method of operating an intermediate node of a telecommunications system.

As illustrated in FIG. 12, the intermediate node 34" can be configured to operate upon various scenarios. For a first scenario, the processor 52 of the intermediate node 34" can be configured to use, for each of plural processed packets of a same packet flow (e.g., RoHC CID or radio bearer), the quality of service information included with the compressed header of a respective packet bearing the combined quality of service information when performing the function for the respective packet For a second scenario, the processor 52 of the intermediate node 34" can be configured to use, for each of plural processed packets belonging to different packet flows for a same user, the quality of service information included with the compressed header of a respective packet bearing the combined quality of service information when performing the intermediate node function for the respective packet.

For a third scenario, the processor 52 of the intermediate node 34" can be configured to use the quality of service information included with the compressed header when performing the function for a packet destined for plural users.

FIG. 12 illustrates basic, representative acts, steps, or events involved in a third mode of a method of the technology, and in particular a method of operating an intermediate node of a telecommunications system which handles a flow of data packets. The method of this intermediate node operation mode basically comprises act 12-1 and act 12-2 shown in FIG. 12. Act 12-1 comprises inspecting a compressed header of a packet (e.g., a channel part of a header of the packet) received from another node to obtain quality of service information for the packet (e.g., to obtain the header-included quality of service information $QoS_I$). Act 12-1 can be preformed by the packet inspector 50 of intermediate node 34" of the third embodiment of FIG. 9. Act 12-2 comprises performing a function at a sub-flow granularity level using the combined quality of service information of the packet. Act 12-2 can be performed by a processor such as intermediate node processor 52 of intermediate node 34" of FIG. 9. An example of a sub-flow granularity level is a per-packet granularity level.

Figure 13:
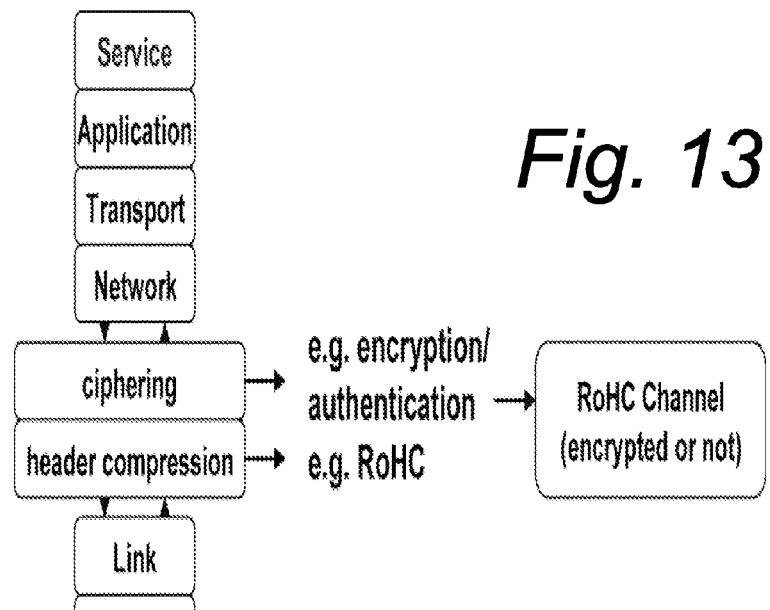
FIG. 13 is a diagrammatic view illustrating performance of processes such as encryption and header compression.

Thus, different nodes supporting a QoS channel may apply functions that can benefit from knowledge of different QoS requirements from each of these layers. Such processes are those shown in FIG. 11 and mentioned above. Additional processing performed on data packets, or PDUs, such as e.g. ciphering (encryption) and header compression (e.g. ROHC) may also introduce some differentiation between the relative priority and importances of each packet, as illustrated in FIG. 13. For example, resynchronization of the ciphering context and/or of the header compression context, and/or conveying control parameters for the e.g. compression algorithm and/or conveying repairs and/or important change patterns normally have more importance than other packets for the performance of these algorithms.

Thus, in accordance with the third embodiment and third mode described above, an intermediate node such as intermediate node 34" inspects the compressed header in the Service Data Unit (SDU), and performs a function, e.g., scheduling, queue management, etc., based on the QoS indication provided by the header compression protocol—between packets of the same flow (e.g. RoHC CID or radio bearer), between packets of different flows for the same user, or between packet of a plurality of users relative to the same indicator conveyed within the header compression protocol.

For example, the packet inspector 50 of a node such as intermediate node 34" can inspect the header (e.g., the channel part of the compressed header) and extract the header-included quality of service information $QoS_I$ for a PDU. A function of the node (such as that performed by intermediate node processor 52) performs actions based on this $QoS_I$ information. Then the intermediate node may optionally remove the $QoS_I$ information in the PDU. As mentioned above, example specific functions performable using the header-included quality of service information $QoS_I$ include those of FIG. 10.

A few of the functions of intermediate node processor 52 (which utilize the header-included quality of service information $QoS_I$) are now elaborated. One such function is (single user) queue management. Upon queue overflow, PDUs associated to the same user, but may be belonging to different flows or services, found in the queue are identified and prioritized based on the relative priorities and/or importance of each PDU (i.e. not necessarily per service or per flow), e.g., PDUs with no priority or specific importance may be dropped, while PDUs with higher priority may be left in the queue.

Another function performable by intermediate node processor 52 using the $QoS_I$ is (multiple users) queue management. Upon queue overflow, PDUs associated to different users but using the same resources are prioritized based on their relative priorities and/or importance (e.g. not necessarily per user or per service), e.g., PDUs with no priority or specific importance may be dropped independently of which user and/or service it belongs to, while PDUs with higher priority may be left in the queue.

Another function performable by intermediate node processor 52 using the $QoS_I$ is scheduling. Specifically, PDUs associated to the same flow but for which different priorities are associated to PDUs in the transmission buffer (queue) may be sent in a different order, especially for a header compression algorithm supporting out-of-order delivery.

In the example embodiments and modes described herein, inclusion of the header-included quality of service information $QoS_I$ in a header can, at least in some implementations, involve insertion or inclusion of the header-included quality of service information $QoS_I$ in a channel part of the compressed header of the processed packet. By "channel part" is meant a part of the header that must necessarily be made available to intermediate processes supporting the header-compressed channel (including the receiving end). See, for example, the add-QoS octet of FIG. 4B.

In some implementations the includer node is an access Gateway node and the intermediate node can be a base station node (e.g., a NodeB or eNodeB, for example). Other examples include: includer node and intermediate node being the same node (NB, eNB); the includer node being an MBMS gateway and the intermediate node being a eNB; or the includer node being RNC, and the intermediate node being a NB. In 3GPP2, includer node is PDSN and the intermediate node is a base station (BS).

It will be appreciated that functionalities of processor 36; header assemblers 38, 38', and 38"; packet inspector 50; and intermediate node processor 52 can be performed by a processor or controller as those terms are expansively elaborated previously. Moreover, functionalities residing at a same node can be performed by a same or shared set of processors or controllers.

Thus, the technology generally concerns methods, apparatus, systems, and techniques to derive, include, and propagate Quality of Service (QoS) information found in headers and/or payload of upper protocol layers (IP protocols) for a Protocol Data Units (PDU), or information related to optimization algorithms applied to the PDU, within the header compression channel (e.g. RoHC). The technology makes this information available to intermediate link layer processes (e.g. scheduler, H-ARQ, BER target, active queue management) supporting the channel and allow these to implement more flexible QoS-aware algorithms.

In other aspects the technology relates to how this information can be inserted within a channel part of the compressed header, how it can be used by intermediate nodes supporting the channel, and how it can be made so that it involves no additional overhead if desired.

In an example embodiment an apparatus comprises a QoS policy selector that derives QoS indications based on knowledge about specific processing applied to the packet (e.g. header compression, security), as well as based on inspection of selected information in the data packet, especially from the headers. The resulting indication is inserted in the compressed header in a manner that it is accessible and in a manner that it may be removed by intermediate nodes without affecting the semantics of the compressed header. The apparatus also provides provisions related to processing by intermediate nodes, such as scheduling and active queue management (AQM), to differentiate QoS between packets within the same flow (service), between packets over multiple services for a single user, and/or for multiple users, especially when contending for shared resources such as a shared radio channel.

The technology can have QoS derivation performed together with header compression in the same node, in particular with RoHC and conveying the derived QoS information within the header compression protocol. The RoHC channel is operated as a virtual point-to-point network path between compression and decompression endpoints, where a QoS marking is performed and carried within the channel part of the header compression protocol. Layer 2 processes such as scheduling or AQM can use the QoS indicator for each packet being processed for transmission over e.g. a shared channel serving multiple users within one cell, independently of traditional radio bearer boundaries, thus leading to a more flexible (and more accurate) distribution of the shared resources.

The Protocol Data Unit (PDU), i.e. IP packet, is inspected and QoS information from the network layer and from layers above is first extracted. The PDU is then processed by one or more of e.g. header compression, payload compression, signalling compression, ciphering, etc. The extracted QoS information is combined with QoS requirements from the applied processing and inserted into the channel part of the header compression protocol in a manner that it can be read by intermediate nodes supporting the header compression channel.

The technology described herein encompasses numerous embodiments, including any of ciphering and/or header compression and/or payload compression and/or signalling compression providing related QoS information based on its state/algorithm used, combined with IP layer and above QoS indications, carried within a RoHC compressed header.

For RoHC header compression, specifically, the encompassed embodiments include, e.g., (1) compressed header type initializing a new context or associating it with a new CID (e.g. IR, IR-DYN, IR-CR); (2) compressed header type sent resulting of a repair attempt (e.g. IR, IR-DYN, UOR-2 with or without extensions and corresponding compressed header types; (3) compressed header type conveying context update significant to the compression algorithm (e.g. UOR-2 with extension 2 and corresponding header types); and (4) compressed header conveying feedback information, especially negative acknowledgements.

The encompassed embodiments also include in addition the above order having decreasing relative importance with respect to each other, and where smallest header types such as packet type 0 have least priority.

The encompassed embodiments also include those having decreasing priority for compressed headers belonging to the same optimistic approach sequence, whereas the first one is more important relative to the others in the same sequence.

The encompassed embodiments also include those headers having a CRC in R-mode having higher relative importance than headers without a CRC (specifically, headers necessary to update the secure reference such as R-0-CRC when the interpretation interval of the w-lsb encoding method nears exhaustion for the R-0 header type for example).

The encompassed embodiments also include those used in conjunction with ciphering within the RoHC channel, and especially for compressed headers carrying sequencing information necessary for the cryptographic context to be initialized and/or re-synchronized.

The encompassed embodiments also include those involving the QoS information being encoded using variable length encoding and/or similarly to the add-CID octet of the RoHC header as exemplified in FIG. 4B.

The encompassed embodiments also include those involving having separate QoS information for the processes/protocols below the IP layer (e.g. header compression, security, etc), and separate information for the protocols starting from and above IP. In other words, separate levels of QoS requirements with respect to protocol dependencies. For example, if the compression context is assumed to be damaged, a packet solving this problem should have highest precedence, otherwise subsequent packets might not be decompressible.

The technology described herein overcomes many problems, including but not limited to the problems that, absent the presently disclosed technology: (1) there is currently no known solution that handles QoS and header compression together, in a manner that allows intermediate nodes supporting the header compression channel to perform QoS enforcements at the granularity level proposed herein; (2) there is no known state-of-the-art that combines header compression and QoS in a manner such as that described herein; (3) there is no known solution suitable for the transmitter to derive QoS requirements per packet together with a mechanism to relate these requirements between flows and even between served receivers within the same cell, when those are sharing the same radio resources; (4) traditionally, the header compression channel has been seen as one element of a QoS channel; it has so far not being used to implement a per-packet QoS association for layer 2 processes to enforce in nodes other than where header compression is applied.

Figure 14:
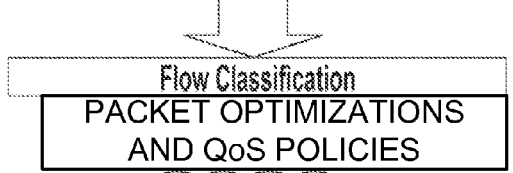
FIG. 14 is a diagrammatic view illustrating facilitation of more flexible layer 2 algorithms and implementations.

The technology described herein enables more flexible and granular QoS in Layer 2 processes. For example, the technology enables flexible QoS algorithm in layer 2 processes not collocated with header compression function. See, for example, FIG. 14, which illustrates facilitation of more flexible layer 2 algorithms and implementations, enforcing QoS policies propagated through the header compressed channel based on the relative priority established for each packet. This priority can be made relative between and for all packets served by a transmitter allocating resources shared between those packets. AQM and scheduling can still be performed per flow if desired, but can now implicitly take into account priority within flows.

Figure 15:
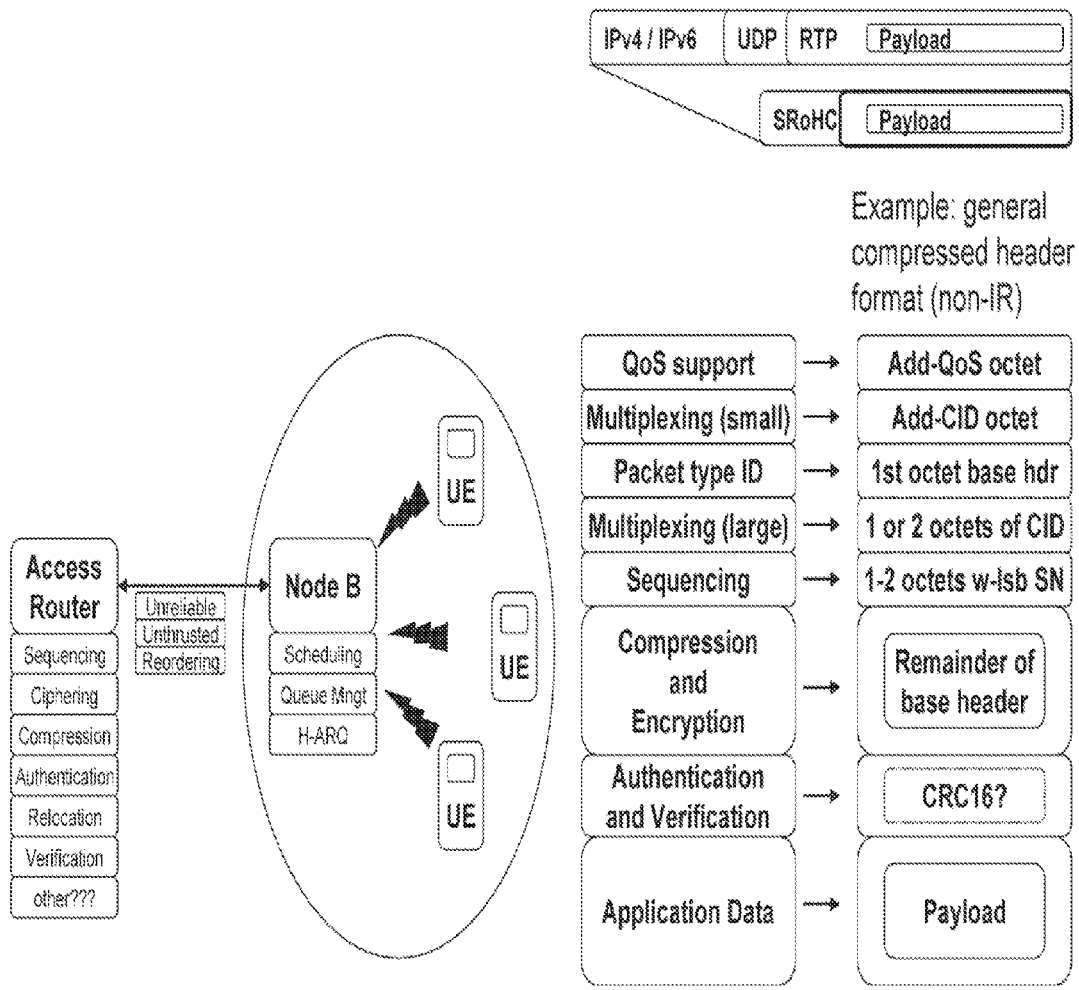
FIG. 15 is a diagrammatic view illustrating an example implementation, including security and support for reordering.
Figure 16:
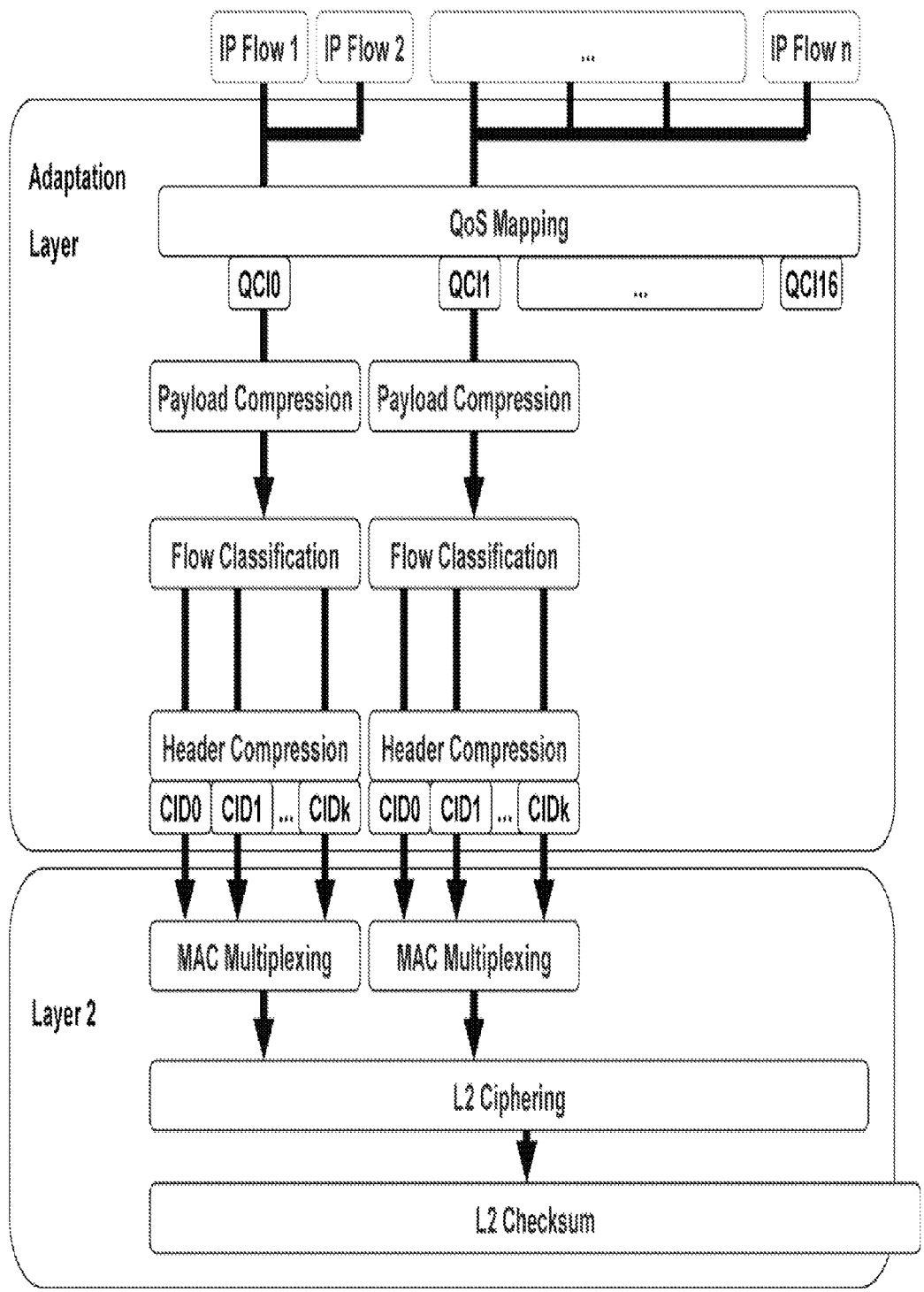
FIG. 16 is a diagrammatic view illustrating defined of quality of service in a connection-oriented fashion (per flow/receiver or per physical channel).
Figure 17:
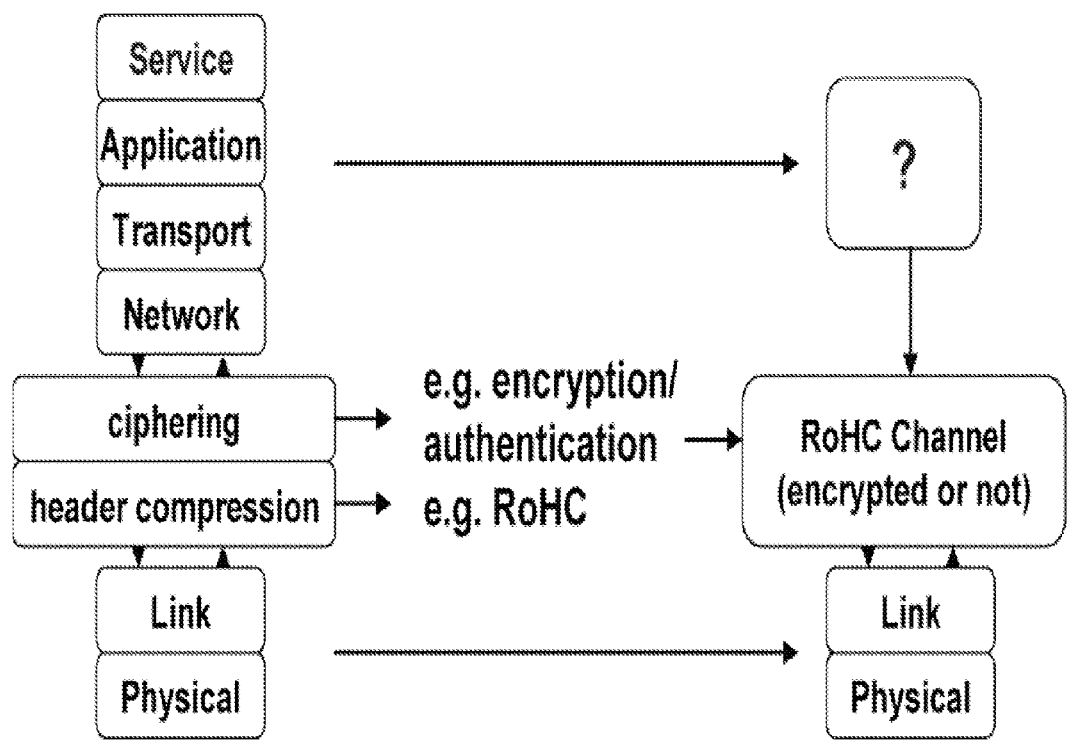
FIG. 17 is a diagrammatic view illustrating the state-of-the-art using an interface between the L2 and upper layers.

The technology described herein also works well in conjunction with other header compression channel functions (such as encryption and sequencing). FIG. 15 illustrates a non-limiting example implementation of the technology described herein, including security and support for reordering. By adding functionality to the RoHC channel and to the compression algorithms, the RoHC channel becomes a complete transport bearer well-suited for shared channels in architectures such as those shown in FIG. 15.

Other benefits of the technology include but not limited to the following:
  more flexible QoS-aware algorithms can be implemented into Layer 2.
  overhead of QoS marking can be avoided over bandwidth limited interfaces.
  highly compatible with the definition of the RoHC channel.
  can be used in the uplink to propagate the QoS desired to the interface(s) between receiving node and decompressing node, if desired.

As used herein, "Header Compression Channel" is a logical unidirectional point-to-point channel carrying header compressed packets from the compressor to the decompressor, optionally carrying feedback information on the behalf of another compressor-decompressor pair operating on a separate header compression channel in the opposite direction.

As used herein, "QoS Channel" is a logical separation corresponding to different treatments applied to a data packet used in a communication system (such as real-time, interactive or best-effort requirement).

As used herein, "QoS Function" is processing affecting the quality of the support provided by the communication system to an individual packet, such as compression of IP headers, payload compression, signaling compression, security functions such as data integrity protection and/or authentication mechanisms, sequencing and in-order delivery guarantees, transmission priority and scheduling, bit error rate, guaranteed packet loss rate, guaranteed maximum and/or average bit rate, reliability, transmission delays, number of retransmission attempts.

As used herein, "Radio Bearer (RB)" is a connection-oriented logical channel, often mapped to a connection-oriented physical channel. Often represents a static allocation of QoS parameters or policy.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A packet handling method for a telecommunications system, the method comprising:
   extracting quality of service information from a received packet, the extracted quality of service information having been supplied by a network layer or higher layer of the telecommunications system;
   processing the received packet, at a compressing node, using a process having a process-associated quality of service requirement to form a processed packet, wherein the process-associated quality of service requirement defines a quality of service required by the process, the process comprising the process-associated quality of service requirement comprising at least one of the following: header compression; payload compression; signaling compression; encryption; authentication; checksumming for verification; and sequencing;
   deriving header-included quality of service information using both the quality of service information extracted from the received packet and information indicative of the process-associated quality of service requirement;
   including, in a channel part of a compressed header for the processed packet, the header-included quality of service information, wherein the channel part of the compressed header is accessible by intermediate nodes on a channel between the compressing node and a decompressing node; and
   transmitting the processed packet over the channel, wherein the processed packet is at a same layer as the received packet.

2. The method of claim 1,
   wherein the packet handling is performed at a first node of a network, and
   wherein the method further comprises using the header-included quality of service information to perform an intermediate node function at an intermediate node of the network, the intermediate node being intermediate the first node and a receiver.

3. The method of claim 2, wherein the intermediate node function is at least one of the following: a queue management function; a scheduling function; a power setting function; a target number of transmissions function; a hybrid automatic repeat request (HARQ) function; a bit error rate (BER) function; a segmentation and concatenation function; a multi-user frame function.

4. The method of claim 2, further comprising, performing at least one of the following:
   for each of plural processed packets of a same packet flow, using the header-included quality of service information included with the compressed header of a respective processed packet bearing the header-included quality of service information when performing the intermediate node function for the respective processed packet; and
   for each of plural processed packets belonging to different packet flows for a same user, using the header-included quality of service information included with the compressed header of a respective processed packet bearing the header-included quality of service information when performing the intermediate node function for the respective processed packet.

5. The method of claim 1, wherein the step of deriving the header-included quality of service information comprises using a first value indicative of the process-associated quality of service requirement and a second value indicative of the quality of service information extracted from the received packet as inputs to obtain a value that represents the derived header-included quality of service information.

6. The method of claim 5, wherein the step of deriving the header-included quality of service information comprises using the first and second values as indices to a look up table.

7. A node of a telecommunications system, the node comprising:
   an extractor configured to extract quality of service information from a received packet, the extracted quality of service information having been supplied by a network layer or higher layer of the telecommunications system;
   a processor configured to process the received packet using a process having a process-associated quality of service requirement to form a processed packet, wherein the process-associated quality of service requirement defines a quality of service required by the process, the process comprising the process-associated quality of service requirement comprising at least one of the following: header compression; payload compression; signaling compression; encryption; authentication; checksumming for verification; and sequencing;
   a header assembler configured to derive header-included quality of service information using both the quality of service information extracted from the received packet and information indicative of the process-associated quality of service requirement,
   wherein the header assembler is configured to include, in a channel part of a compressed header for the processed packet, the header-included quality of service information, wherein the channel part of the compressed header is accessible by intermediate nodes between the node and a decompressor,
   wherein the node is configured to transmit the processed packet over the channel, wherein the processed packet is at a same layer as the received packet.

8. The node of claim 7, wherein the header assembler is configured to derive the header-included quality of service information by using a first value indicative of the process-associated quality of service requirement and a second value indicative of the quality of service information extracted from the received packet as inputs to obtain a value that represents the derived header-included quality of service information.

9. The node of claim 8, wherein the header assembler is configured to derive the header-included quality of service information by using the first and second values as indices to a look up table.

10. A node of a telecommunications system which handles a flow of data packets, the node comprising:
   a packet inspector configured to inspect a channel part of a compressed header of a processed packet received from another node to obtain header-included quality of service information for the processed packet, wherein the header-included quality of service information indicates a priority associated with the processed packet, wherein the header-included quality of service information has been derived at the another node using both quality of service information extracted from a received packet by the another node and information indicative of a process-associated quality of service requirement of a process performed at the another node, the process of the another node comprising at least one of the following: header compression; payload compression; signaling compression; encryption; authentication; checksumming for verification; and sequencing; and a processor configured to perform a function at a sub-flow granularity level based on the priority associated with the processed packet, wherein the processed packet is at a same layer as the received packet.

11. The node of claim 10, wherein the function is at least one of the following: a queue management function; a scheduling function; a power setting function; a target number of transmissions function; a hybrid automatic repeat request (HARQ) function; a bit error rate (BER) function; a segmentation and concatenation function; a multi-user frame function.

12. The node of claim 10, wherein the processor is configured to use, for each of plural processed packets of a same packet flow, the quality of service information included with the compressed header of a respective packet bearing the header-included quality of service information when performing the function for the respective packet.

13. The node of claim 10,
wherein the node is an intermediate node situated between the another node and a receiver, and
wherein the processor is configured to use the header-included quality of service information when performing the function for the processed packet.

14. The node of claim 10, wherein the processor is configured to use the quality of service information included with the compressed header when performing the function for a packet destined for plural users.

15. The node of claim 10, wherein the processor is configured to use the quality of service information included with the compressed header to perform the function at a per-packet granularity level.

16. A method of operating a node of a telecommunications system which handles a flow of data packets, the method comprising:
inspecting a channel part of a compressed header of a processed packet received from another node to obtain header-included quality of service information for the processed packet, wherein the header-included quality of service information indicates a priority associated with the packet, the header-included quality of service information having been derived at the another node using both quality of service information extracted from a received packet by the another node and information indicative of a process-associated quality of service requirement of a process performed at the another node, the process of the another node comprising at least one of the following: header compression; payload compression; signaling compression; encryption; authentication; checksumming for verification; and sequencing; and
performing a function at a sub-flow granularity level based on the priority associated with the processed packet,
wherein the processed packet at a same layer as the received packet.

17. The method of claim 16, wherein the function is at least one of the following: a power setting function; a queue management function; a scheduling function; a target number of transmissions function; a hybrid automatic repeat request (HARQ) function; a bit error rate (BER) function; a segmentation and concatenation function; a multi-user frame function.

18. The method of claim 16, further comprising using, for each of plural processed packets of a same packet flow, the quality of service information included with the compressed header of a respective packet bearing the header-included quality of service information when performing the function for the respective packet.

19. The method of claim 16, wherein the node is an intermediate node situated between the another node and a receiver, the method further comprising using the header-included quality of service information when performing the function for the processed packet.

20. The method of claim 16, further comprising using the quality of service information included with the compressed header when performing the function for a packet destined for plural users.

21. The method of claim 16, further comprising performing the function at a per-packet granularity level using the header-included quality of service information of the packet.

22. A method of operating an includer node of a telecommunication system, the method comprising:
receiving a packet at the includer node, the received packet comprising a received header and a received payload;
extracting, by the includer node, quality of service information from the received packet, the extracted quality of service information ($QoS_E$) having been supplied by a network layer or higher layer of the telecommunications system;
processing, by the includer node, the received packet using a process having a process-associated quality of service requirement ($QoS_P$) to form a processed packet, the processed packet comprising a compressed header and a payload, the processed packet being at a same layer as the received packet;
deriving, by the includer node, header-included quality of service information ($QoS_I$) using both the $QoS_E$ and the $QoS_P$;
including, by the includer node, the $QoS_I$ in a channel part of the compressed header of the processed packet; and
transmitting, by the includer node, the processed packet towards a receiver.

23. The method of claim 22, wherein the process having the $QoS_P$ comprises any one of a header compression, a payload compression, a signaling compression, an encryption, an authentication, a checksumming for verification, and a sequencing.

24. The method of claim 22,
wherein the channel part of the compressed header is accessible by an intermediate node on a channel in between the includer node and the receiver, and
wherein the step of transmitting the processed packet towards the receiver comprises transmitting the processed packets on the channel.

25. A method of operating an intermediate node of a telecommunication system, the intermediate node being in a path between an includer node and a receiver, the method comprising:
receiving, at the intermediate node, a processed packet from the includer node, the processed packet comprising a compressed header and a processed payload, the compressed header comprising a channel part;
obtaining, by the intermediate node, header-included quality of service information ($QoS_I$) from inspecting the channel part of the compressed header; and
performing, by the intermediate node, an intermediate node function at a sub-flow granularity level based on the $QoS_I$,
wherein the $QoS_I$ represents a combined QoS information derived by the includer node based on a process-associated quality of service requirement ($QoS_P$) and an extracted quality of service information ($QoS_E$), wherein the $QoS_E$ is extracted by the includer node from a packet received at the includer node, the received packet comprising a received header and a received payload, wherein the $QoS_P$ is associated with a process performed on the received packet by the includer node, and wherein the processed packet is at a same layer as the received packet.

26. The method of claim 25, wherein the intermediate node function comprises any combination of a queue management, a scheduling, a target number of transmissions, a hybrid automatic repeat request (HARQ), a bit error rate (BER), a segmentation and concatenation, and a multi-user frame.

27. The method of claim 25, wherein the process having the $QoS_P$ comprises any one of a header compression, a payload compression, a signaling compression, an encryption, an authentication, a checksumming for verification, and a sequencing.

28. The method of claim 25, wherein the intermediate node receives plural processed packets from the includer node, and wherein the step of performing the intermediate node function at the sub-flow granularity level comprises performing the intermediate node function for the plural processed packets at a per-packet level.

* * * * *

UNITED STATES PATENT AND TRADEMARK OFFICE
CERTIFICATE OF CORRECTION

PATENT NO. : 8,948,206 B2  
APPLICATION NO. : 11/846880  
DATED : February 3, 2015  
INVENTOR(S) : Pelletier et al.

Page 1 of 1

It is certified that error appears in the above-identified patent and that said Letters Patent is hereby corrected as shown below:

In the Specification

In Column 2, Line 13, delete "(ROHC)." and insert -- (ROHC): --, therefor.

In Column 2, Line 13, delete "profiles." and insert -- profiles: --, therefor.

In Column 2, Line 15, delete "(ROHC)." and insert -- (ROHC): --, therefor.

In Column 2, Line 17, delete "(ROHC)." and insert -- (ROHC): --, therefor.

In Column 2, Line 19, delete "(ROHC)." and insert -- (ROHC): --, therefor.

In Column 2, Line 23, delete "(ROHCv2)." and insert -- (ROHCv2): --, therefor.

In Column 10, Line 22, delete "$QoS_I$ by" and insert -- $QoS_I$ --, therefor.

In Column 12, Line 37, delete "(QoS))" and insert -- (QoS) --, therefor.

In Column 16, Line 64, delete "eg.," and insert -- eg.,: --, therefor.

In the Claims

In Column 21, Line 56, in Claim 16, delete "packet at" and insert -- packet is at --, therefor.

Signed and Sealed this  
Seventh Day of July, 2015

Michelle K. Lee  
*Director of the United States Patent and Trademark Office*